June 19, 1934. J. A. BERGSTROM 1,963,542
SELF TAPPING SCREW
Filed Sept. 21, 1931
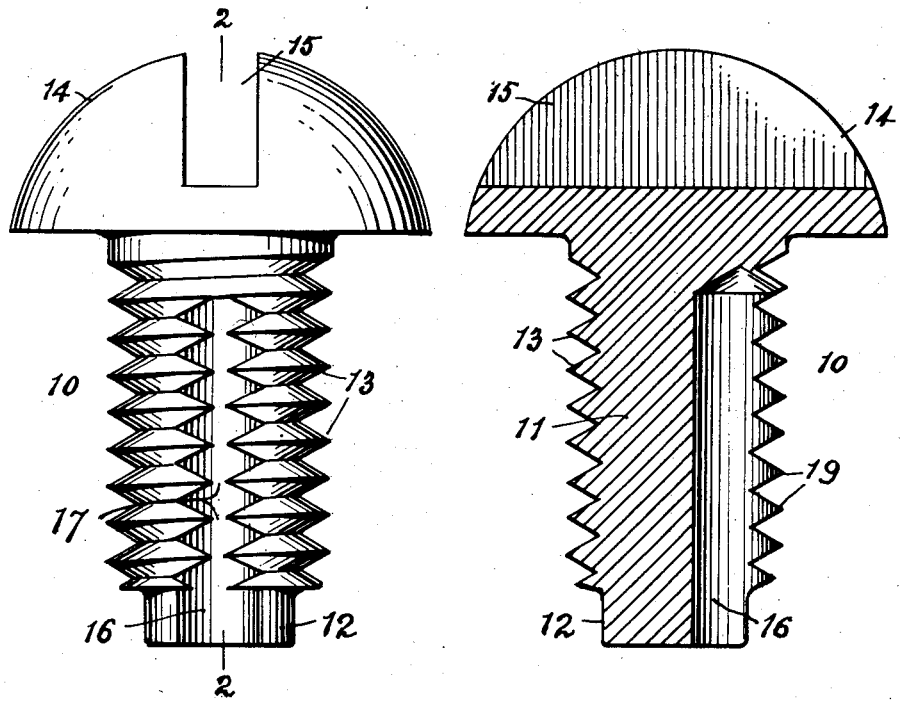
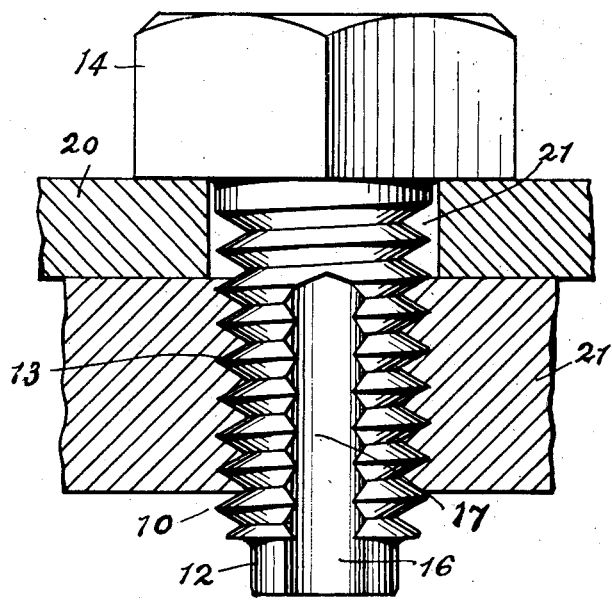
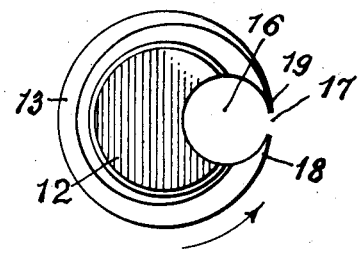
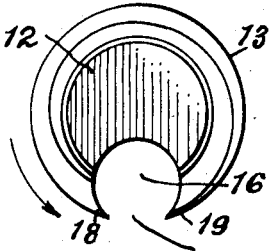
INVENTOR
John A. Bergstrom
By Cheever, Cox & Moore
Attorneys Patented June 19, 1934

1,963,542

UNITED STATES PATENT OFFICE 1,963,542

SELF TAPPING SCREW

John A. Bergstrom, Newark, N. J., assignor, by mesne assignments, to Illinois Tool Works, Chicago, Ill., a corporation of Illinois Application September 21, 1931, Serial No. 563,955

6 Claims. (Cl. 85—47)

This invention relates to improvements in self tapping hardened screws or bolts provided with a pilot end and having standard threads either sharp or flat, that will readily, when screwed into a hole of proper size, cut its own thread into soft metal, sheet iron, bakelite or the like without injury to the material. The screw is provided with flexible means so that when the screw is turned in a reverse direction or being unscrewed from the hole, will slightly expand and offer a certain resistance without injury to the threads in the hole, so that the same screw may be used over again in the same hole.

The object of the invention is to provide a hardened transversely resilient self tapping screw provided with a pilot end and having standard threads, which will cut its own threads into soft metal, sheet iron or the like.

Another object of the invention is to provide a hardened self tapping screw with standard threads, having a pilot end for properly guiding the screw into a hole of proper size for the purpose of cutting its own threads in soft metal or the like.

And still another object of the invention is to provide a hardened screw, with standard threads, having undercut cutting teeth, which are more or less resilient. This undercut is formed by the drilling of a hole in the stem transversely eccentric and parallel with its axis, thereby creating an opening in the periphery of the stem to intersect the threads in concaved lines. This drilled hole or holes provides ample space for the discharge of the chips formed by the cutting edges, thereby preventing crowding and cracking of the material when screwed into brittle material. When the screw is screwed home, the resiliency of the stem and cutting teeth will slightly expand the screw and when subjected to jar or vibration will have a tendency to lock the screw in position. On the reverse movement of the screw, the expanded cutting teeth will offer a certain frictional resistance in the threads and retard the withdrawal of the screw, without injury to the threads.

With these and other objects in view the invention consists in the details of construction and arrangement of parts to be hereinafter more fully described and claimed and illustrated in the accompanying drawing, forming part of this specification in which similar numerals of references designate corresponding parts throughout the several views in which:—

Fig. 1 is a vertical front elevation of my new and improved screw, showing the transversely resilient stem and cutting edges.

Fig. 2 is a cross-section on line 2—2 of Fig. 1.

Fig. 3 is an inverted plan view of the end of the stem of the transversely resilient screw, omitting the head.

Fig. 4 is a vertical front elevation of the screw or bolt in an assembly, showing a somewhat wider opening of the cutting edges and Fig. 5 is an inverted plan view of the end of the stem of the screw as shown in Fig. 4, omitting the head.

The numeral 10 designates a hardened self tapping screw made according to my invention and is composed of a body or stem 11 having a short lower cylindrical portion 12 which serves as a pilot when the screw is screwed into a hole of proper size. The object of the pilot portion is to guide the screw in a rectilinear position in relation to the hole to be tapped by the screw.

The threads 13 may be either sharp or square, are of the standard form and may have any approved pitch. The threads start near the end of the screw, above the pilot and continue towards the head 14. The head may be made of any approved form and have the usual slit 15, for the reception of a screw driver, or may be made in the shape of a regular bolt head as shown in Fig. 4. The diameter of the pilot end is somewhat smaller than the minor diameter of the thread and may be made any desired length to suit various conditions.

A hole 16 is drilled into the body or stem of the screw 10, located transversely eccentric and parallel with its axis, in close proximity to the outer edge of the major diameter of the threads. The eccentricity of this hole may be varied, that is to say, that the center may be spaced any distance from the center of the screw 10 to such a distance which will determinate the proper opening or distance between the cutting edges of the threads. The hole 16 will create an opening in the periphery of the stem to intersect the threads in concaved lines and at the same time make the screw transversely resilient. When the screw is screwed into the material, the undercut cutting edges of the thread will cut away the material and the chips which have been formed will pass through this hole 16, thereby avoiding any stripping or clogging of the threads.

By referring to Fig. 1 it will be seen that the opening 17, in the side of the screw, caused by the drilled hole 16, leaves serrated cutting edges 18—19 of the thread on each side of the opening, and by referring to Fig. 3, it will be seen that these cutting edges 18—19 are undercut, making them more or less resilient or flexible and at the same time make them better cutting edges.

If the screw 10 is turned in the direction of the arrow as indicated in Fig. 3, it will be seen that the cutting edge 18 will cut a thread in a substance as the screw is rotated, and that the flexible cutting edge 19 would be somewhat depressed, or forced towards the center of the screw owing to the pressure exerted against it by the substance, or in other words, this edge does not do any cutting, but on the reverse movement of the screw the stem of the screw with its cutting edge would have a tendency to expand or straighten out, or move away from the center of the screw thereby practically transversely expanding the screw and as the outer end of this cutting edge comes into closer contact with the threads in the substance, it will have a tendency to retard the backward movement of the screw. As this cutting edge does not injure the threads, it is evident that the screw may be taken out and used over again in the same hole, without injury to the thread in the hole or to the screw.

By referring to Fig. 5 it will be seen that the center of the hole 16 has been moved farther away from the center of the screw 10 than shown in Fig. 3, this makes the serrated opening 17 in the screw considerably wider than the opening shown in Fig. 4 and the undercut of the cutting edges considerably less. Fig. 4 also illustrates how an assembly can be made by fastening two pieces of metal or the like together. The top piece 20 has a drilled hole 21 for the reception of the screw 10 which is screwed into the lower piece 23 without first tapping the hole.

Any number of holes 16 may be drilled into the body of the screw around the circumference thereof, depending upon the size of the screw. These holes may be drilled to any desired depth and diameter into the body or stem of the screw, depending upon the length of the screw or bolt and the thickness and nature of the material in which it is to be used.

It is now evident that with a screw of this construction, an assembly may be made up in shorter space of time than ordinarily required, as it is unnecessary to tap any hole for the reception of the screws, as it is only necessary to drill the holes of proper size so that the pilot point will enter. When the screws are used in brittle material, such as bakelite or the like, they will cut a clean thread without stripping or clogging and will not crack or injure the material, owing to the clearance back of the cutting edges, as the chips will pass through the drilled hole 16 without injury to the threads.

I claim:—

1. A thread cutting fastener including a threaded body, said body having a recess extending longitudinally thereof and separating said body into a pair of sections, one of said sections having a cutting edge and the other section being yieldable for increasing the cutting effectiveness of said edge, said recess having a depth not greater than the radius of the screw body.

2. A thread cutting fastener including a threaded body, said body having a recess extending longitudinally thereof and separating said body into a pair of sections, one of said sections having a cutting edge and the other section being yieldable for increasing the cutting effectiveness of said edge, said recess having a depth not greater than the radius of the screw body, and a pilot provided at the entering end of said screw to facilitate its insertion within an unthreaded aperture of a work-piece.

3. A thread cutting fastener having a threaded body and a recess dividing said body into companion sections, one of which is provided with a cutting edge, said recess extending longitudinally of the body and having a wall section so disposed as to undercut the section provided with a cutting edge and thereby increasing the cutting effectiveness of said edge, the section opposite said cutting edge being yieldable so as to increase the cutting effectiveness of said edge when the fastener is applied to an unthreaded aperture, and a head thereon adapted to be clamped against the work piece to which the threaded body is applied.

4. A thread cutting fastener having a threaded body and a recess dividing said body into companion sections, one of which is provided with a cutting edge and the other yieldable to render the cutting edge more effective, said recess extending longitudinally of the body and having a wall section which is arcuately formed.

5. A thread cutting fastener including a threaded body, and a peripheral recess extending longitudinally of the body and separating said body into a pair of sections, one of which has a cutting edge, the wall of said recess in cross section conforming with a section of a circle, which section is greater than a semi-circle, and a head thereon adapted to be clamped against the work piece to which the threaded body is applied.

6. A thread cutting fastener including a threaded body having a recess extending longitudinally of the body and dividing said body into a pair of sections, said recess opening outwardly along the periphery of the body, the width of the recess at said periphery being less than the width of the recess intermediate the periphery and the center of the body, a cutting edge being presented along the periphery of the threaded body which is adapted to cut a thread within an unthreaded aperture in a relatively hard work piece, the section opposite the cutting edge being yieldable so as to increase the cutting effectiveness of said edge when the fastener is applied to an unthreaded aperture of a work piece, and a head on the fastener adapted to be clamped against the work piece to which the fastener is applied.

JOHN A. BERGSTROM.